(12) United States Patent
Enomoto et al.

(10) Patent No.: US 6,175,046 B1
(45) Date of Patent: Jan. 16, 2001

(54) METHOD OF HYDROGENATING AROMATIC HYDROCARBONS IN HYDROCARBON OIL

(75) Inventors: Toshiyuki Enomoto, Yokohama; Yasuo Nakatsuka, Kanagawa-ken; Takashi Ino, Kanagawa-ken; Minoru Hatayama, Kanagawa-ken, all of (JP)

(73) Assignee: Nippon Oil Company, Limited, Tokyo (JP)

( * ) Notice: Under 35 U.S.C. 154(b), the term of this patent shall be extended for 0 days.

(21) Appl. No.: 09/078,058

(22) Filed: May 13, 1998

Related U.S. Application Data

(62) Division of application No. 08/601,225, filed on Feb. 14, 1996, now abandoned.

(30) Foreign Application Priority Data

Feb. 14, 1995 (JP) ........................................ 7-47975
Jan. 19, 1996 (JP) ........................................ 8-24912

(51) Int. Cl.[7] ................................................ C07C 5/10
(52) U.S. Cl. ......................... 585/269; 208/143; 208/144; 208/145; 585/266; 585/752
(58) Field of Search ..................... 208/143, 144, 208/145; 585/752, 266, 269

(56) References Cited

U.S. PATENT DOCUMENTS

| | | | |
|---|---|---|---|
| 2,432,746 | * 12/1947 | Gary et al. ............................. | 502/81 |
| 2,547,036 | * 4/1951 | Mills ...................................... | 502/81 |
| 2,576,653 | * 11/1951 | Winnetka ............................... | 502/81 |
| 2,582,956 | * 1/1952 | Bond ..................................... | 502/81 |
| 2,744,056 | * 5/1956 | Offutt et al. ..................... | 208/111.25 |
| 3,130,006 | * 4/1964 | Rabo et al. ........................... | 502/64 |
| 3,148,159 | * 9/1964 | Hodgkiss ............................... | 502/62 |
| 3,162,597 | * 12/1964 | David, Jr. et al. ................... | 208/216 |
| 3,201,197 | * 8/1965 | Showalter ............................ | 423/112 |
| 3,714,030 | * 1/1973 | Winsor et al. ....................... | 208/210 |
| 4,514,510 | * 4/1985 | Alexander ........................... | 501/148 |
| 4,605,806 | * 8/1986 | Ballantine et al. ................. | 585/467 |
| 4,618,412 | * 10/1986 | Hudson et al. ........................ | 208/59 |
| 4,897,175 | * 1/1990 | Bricker ................................ | 208/12 |
| 4,992,157 | * 2/1991 | Bricker et al. ....................... | 208/12 |
| 5,007,998 | * 4/1991 | Gruia .................................... | 208/59 |
| 5,023,221 | * 6/1991 | Occelli .................................. | 502/66 |

* cited by examiner

Primary Examiner—Walter D. Griffin
Assistant Examiner—Nadine Preisch
(74) Attorney, Agent, or Firm—Ostrolenk, Faber, Gerb & Soffen, LLP

(57) ABSTRACT

There is provided a catalyst that is highly resistant to sulfur and nitrogen compounds and active for hydrogenation and shows a low hydrocracking rate and a long service life as well as a method of converting aromatic hydrocarbons in hydrocarbon oil containing sulfur and nitrogen compounds into saturated hydrocarbons by using such a catalyst. A method of hydrogenating aromatic hydrocarbons in hydrocarbon oil containing 80 wt % or more of a fraction having a boiling point of 170 to 390° C. and said aromatic hydrocarbons is characterized in that the hydrocarbon oil is brought into contact with hydrogen in the presence of a catalyst containing clay minerals having principal ingredients of Si and Mg as carrier and at least one of the VIII-group metals of periodic table as active metal.

20 Claims, 1 Drawing Sheet

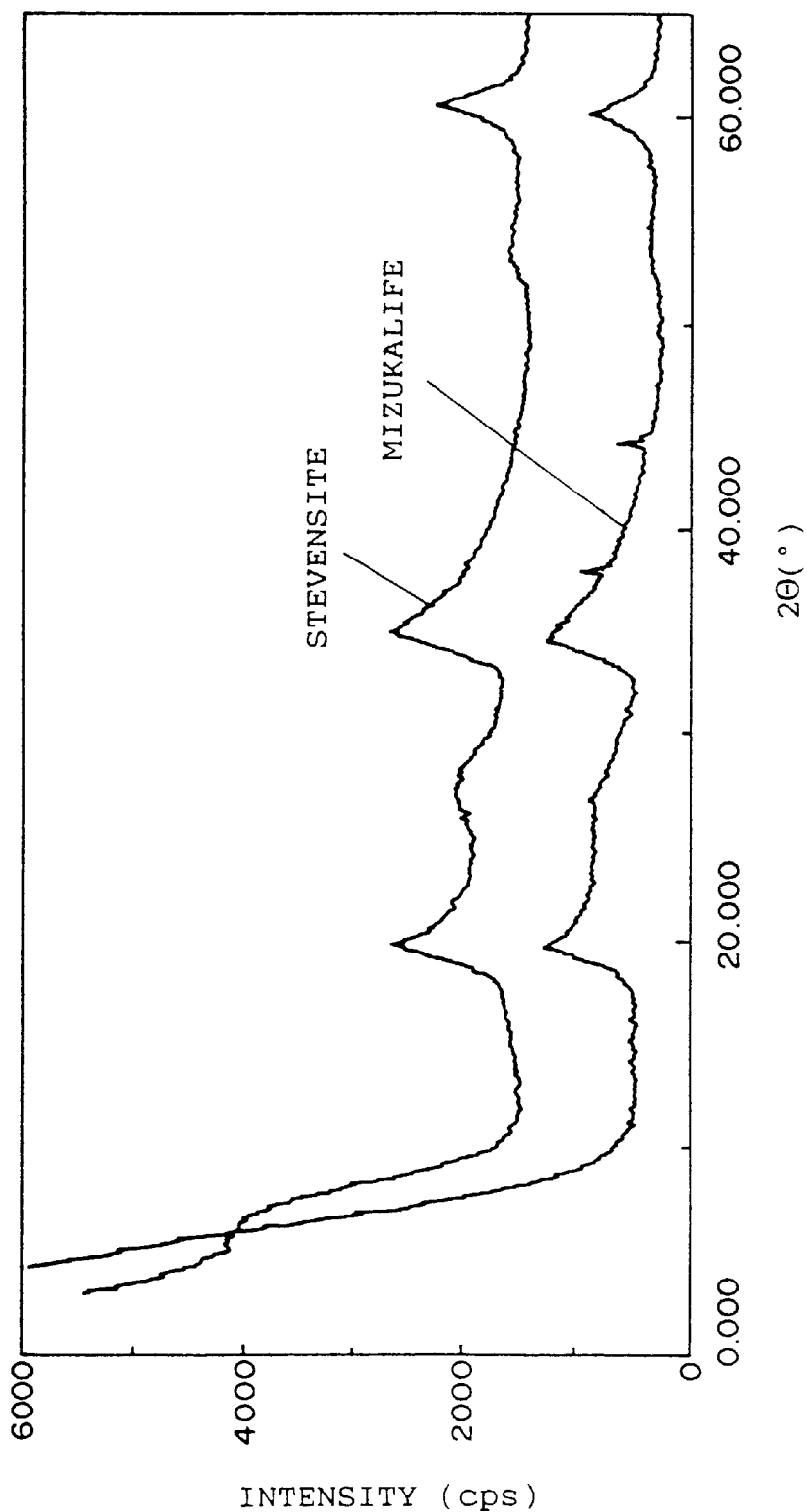

METHOD OF HYDROGENATING AROMATIC HYDROCARBONS IN HYDROCARBON OIL

This is a divisional of application Ser. No. 08/601,225, filed Feb. 14, 1996, now abandoned.

BACKGROUND OF THE INVENTION

1. Field of the Invention

This invention relates to a method of hydrogenating hydrocarbon oil and to a catalyst to be used for such a method and, more particularly, it relates to a method of hydrogenating aromatic hydrocarbons contained in hydrocarbon oil and to a catalyst suitably used for such a method that is highly resistant to sulfur and nitrogen compounds, shows a high hydrogenating activity with a relatively low rate of hydrocracking and has a long service life as catalyst.

2. Background Art

Unsaturated hydrocarbons such as aromatic hydrocarbons contained in hydrocarbon oil are chemically highly reactive and can be easily subjected to various reactions such as oxidation to consequently degrade the hydrocarbon oil with time when compared with saturated hydrocarbons contained in hydrocarbon oil. In the case of diesel gas oil, unsaturated hydrocarbons, aromatic hydrocarbons in particular, contained therein can give rise not only to degradation of the oil in terms of coloring in the course of time, but also to remarkably reduction of the cetane value.

Additionally, in recent years, it has been shown that particulate substances in the exhaust gas of diesel engines can be considerably removed by suppressing the aromatic hydrocarbon content in diesel gas oil and, as a matter of fact, reduction of the aromatic hydrocarbon content in diesel gas oil has been strongly demanded from the viewpoint of environment protection.

There have been reports that polycyclic aromatic hydrocarbons having three or more than three aromatic rings in the molecule provide particularly harmful potential hazards to the environment (e.g., "The Release of the 13th World Petroleum Congress", vol.3, p.97, 1992). Thus, it is an urgent demand to reduce the polycyclic aromatic hydrocarbons contained in hydrocarbon oil and having three or more than three aromatic rings in the molecule. Additionally, an enhanced aromatic hydrocarbon content in kerosene can give rise to the problem of lowering the smoke point thereof and, therefore, the content of unsaturated hydrocarbons, that of aromatic hydrocarbons in particular, of kerosene also has to be reduced in some way or another.

Aromatic hydrocarbons and other unsaturated hydrocarbons can be converted into saturated hydrocarbons by hydrogenating them in the presence of a hydrogenating catalyst, although, while unsaturated hydrocarbons other than aromatic hydrocarbons can be easily hydrogenated, aromatic hydrocarbons are less apt to be end this property on the part of aromatic hydrocarbon provides a serious problem to be solved.

Of known hydrogenating catalysts, those realized by causing a stable carrier such as alumina to carry one or more than one of the VIII-group noble metals in the periodic table are promising because they generally have hydrogenating activity. However, such catalysts are typically accompanied by the drawback that they can be poisoned to quickly become poorly active by sulfur compounds and/or nitrogen compounds contained in hydrocarbon oil.

In order to alleviate this drawback, there have been attempts of hydrogenation using a catalyst having a carrier that contains zeolite. However, zeolite is a catalytic substance that is highly active in hydrocracking reactions and therefore a hydrogenation reaction for the purpose of the present invention is inevitably accompanied by a hydrocracking reaction if a catalyst containing zeolite is used.

In the process of hydrogenating the kerosene and gas oil fractions of hydrocarbon oil, hydrocracking reactions have to be suppressed because such reactions can reduce the yield of the desired kerosene or gas oil fractions.

Japanese Patent Application Laid-Open No. 64-66292 discloses a hydrogenation method using a catalyst containing Y-type zeolite having a unit lattice length of 24.20 to 24.30 angstroms and a silica/alumina ratio of 25 or more, said zeolite carrying one or more than one of the VIII-group noble metals in the periodic table.

Japanese Patent Application Laid-Open No. 5-237391 discloses a catalyst containing one or more than one of the VIII-group noble metals in the periodic table carried by zeolite obtained by treating Y-type zeolite having a unit lattice length of less than 24.65 angstroms and a silica/alumina ratio of more than 5, said zeolite containing less than 0.3 wt % of one or more than one alkali or alkaline earth metals, by contacting with an aqueous solution of alkali or alkaline earth metals so as to raise the alkali or alkaline earth metal content of the zeolite by at least one and a half times greater than the content before treating, and also discloses a hydrogenation method using such a catalyst.

The above known methods are intended to suppress the poisoning of catalyst by sulfur and nitrogen compounds contained in the oil to be treated and also the hydrocracking of unsaturated hydrocarbons.

However, these methods cannot overcome the problem of the poisoning of catalyst by sulfur and nitrogen compounds and hence are not capable of making the catalyst sufficiently active for hydrogenation. Additionally, they cannot satisfactorily alleviate the problem of reduced yield of refined oil due to hydrocracking of the oil to be treated and that of a reduced service life of the catalyst due to the coking phenomenon that appears with hydrocracking.

Therefore, it is an object of the present invention to provide a method of converting aromatic hydrocarbons in hydrocarbon oil containing sulfur and nitrogen compounds into saturated hydrocarbons and a catalyst to be used for such a method that is highly resistant to sulfur and nitrogen compounds and active for hydrogenation and shows a low hydrocracking rate and a long service life.

SUMMARY OF THE INVENTION

As a result of intensive research efforts, the inventors of the present invention discovered that a specifically designed catalyst is not only highly resistant to sulfur and nitrogen compounds and active in hydrogenation reactions for converting aromatic hydrocarbons in hydrocarbon oil containing sulfur and nitrogen compounds into saturated hydrocarbons but also shows a low hydrocracking rate and a long service life.

Thus, according to the invention, there is provided a method of hydrogenating aromatic hydrocarbons in a hydrocarbon oil which comprises the step of bringing the hydrocarbon oil containing 80% by weight or more of a fraction having a boiling point of 170 to 390° C. and the aromatic hydrocarbons into contact with hydrogen in the presence of a catalyst comprising a clay mineral having principal ingredients of Si and Mg as carrier and at least one of the VIII-group metals of periodic table as active metal.

Therefore, according to the invention, there is also provided a catalyst for hydrogenating aromatic hydrocarbons in hydrocarbon oil, characterized in that said catalyst contains clay minerals having principal ingredients of Si and Mg as carrier and at least one of the VIII-group metals of periodic table as active metal.

Now, the present invention will be described in greater detail.

BRIEF DESCRIPTION OF THE DRAWING

The FIGURE is a graph showing the X-ray diffraction pattern of Mizukalife (trade name) and that of the synthesized stevensite used in Catalyst Preparation 1 as will be described hereinafter.

DETAILED DESCRIPTION OF THE PREFERRED EMBODIMENTS

Carriers for catalyst that can be used for the purpose of the present invention contains clay minerals having principal ingredients of Si and Mg. For the purpose of the present invention, clay minerals having principal ingredients of Si and Mg refer to those containing Si and Mg most in terms of the number of atoms except oxygen atom which is always found most abundantly in clay minerals and hydrogen atom which is contained in hydroxy groups and water that are ubiquitous in clay minerals. (There may be more Si atoms than Mg atoms or vice versa.) Such clay minerals may contain other elements such as Al, Fe, alkali metals, alkaline earth metals and/or F to a less extent.

When expressed in terms of oxides according to the common practice in the field of clay mineral chemistry, clay minerals with principal ingredients of Si and Mg that can be used for the purpose of the present invention contains $SiO_2$ and $MgO$ in an amount of 50 wt % or more, preferably 60 wt % or more, and most preferably 70 wt % or more.

Widely referenced authoritative publications on the classification and definition of clay minerals include "Kohbutsugaku (Mineralogy)" (by Nobuo Morimoto, Ichiro Sunagawa and Akiho Miyashiro; Iwanami-shoten) and "Nendo (Clay) Handbook" (edited by Japan Clay Society; Gihodo).

Clay mineral is a principal component of clay. They are mostly found as fine particles of moisture-containing crystalline silicates of Al, Mg and Fe that give plasticity to clay that contains them.

Silicate minerals are structurally based on $SiO_4$ tetrahedrons, each having four oxygen atoms equiangularly arranged around an Si atom, and classified by the form of crystal lattice produced by condensation of such tetrahedrons. Silicate with a crystal lattice structure comprising only independent $SiO_4$ tetrahedrons is referred to as nesosilicate. Silicate having a crystal lattice structure formed by condensation of paired $SiO_2$ tetrahedrons is referred to as sorosilicate. Cyclosilicate is realized by annular condensation of $SiO_2$ tetrahedrons. Inosilicate has a linearly chained or belt-like structure of $SiO_2$ tetrahedrons, whereas phyllosilicate has a two-dimensionally layered lattice structure and tectosilicate has a three-dimensional network-like lattice structure.

Clay minerals mostly consist of phyllosilicate that has a layered structure. Phyllosilicate typically comprises tetrahedral sheets, in each of which $SiO_2$ tetrahedrons are arranged in a plane, and octahedral sheets composed of regular octahedrons, each of which is formed by arranging six oxygen atoms around Al, Mg or the like in a coordinated way.

When metal ions found in an octahedral sheet of phyllosilicate are mostly divalent ions such as Mg ions, the sheet shows a structure similar to that of brucite $(Mg(OH)_2)$ to make it a trioctahedral sheet. When metal ions found in an octahedral sheet of phyllosilicate are mostly trivalent ions such as Al ions, the sheet shows a structure similar to that of gibbsite $(Al(OH)_3)$ to make it a dioctahedral sheet. The number of ions in a dioctahedral sheet is ⅔ of that of ions found in a trioctahedral sheet.

Phyllosilicate basically shows either a two-layered structure comprising a tetrahedral sheet and an octahedral sheet or a three-layered structure comprising an octahedral sheet sandwiched by a pair of tetrahedral sheets. Kaolinite is a typical example of phyllosilicate having a two-layered structure, while mica and smectite are two typical examples of phyllosilicate having a three-layered structure.

Clay minerals mostly comprise a stack of a number of such sheets. In most clay minerals, the amount of the electric charge of metal ions found in these sheets is short in comparison with that of the electric charge of oxygen ions there and, therefore, cations (typically ions of alkali metals and alkaline earth metals) existing between adjacent sheets make up the shortage of electric charge. Such cations are apt to be subjected to ion-exchange. In other words, such clay minerals have an ion-exchange capacity.

While both natural and synthetic clay minerals having principal ingredients of Si and Mg may be used for the purpose of the present invention, synthesized clay minerals are preferable. Specific examples of such clay minerals include talc, stevensite, hectorite, saponite, varmiculite, sepiolite, palygorskite, serpentine and chlorite.

For the purpose of the present invention, clay minerals do not contain tectosilicate nor zeolite, which is a sort of tectosilicate.

For the purpose of the present invention, clay minerals having principal ingredients of Si and Mg preferably have an ion-exchange capacity. Specific examples of such clay minerals include stevensite, hectorite, saponite, vermiculite, sepiolite, palygorskite and chlorite, of which stevensite, hectorite, saponite, vermiculite and sepiolite are preferable. More preferable clay minerals that can be used for the purpose of the invention are stevensite, hectolite and saponite, of which stevensite is most preferable.

Clay minerals having an ion-exchange capacity will be described further by way of stevensite. Like talc, stevensite is a sort of smectite having a three-layered structure including a trioctahedral sheet. Although the composition of a clay mineral cannot be described in simple terms because clay minerals are nonstoichiometric compounds and contain various impurities, stevensite ideally has a composition expressed by the general formula 1 below.

$$Na_{2x}(Mg_{0-x})[Si_4]_2O_{20}(OH)_4 \cdot nH_2O \qquad \text{(formula 1)}$$

Stevensite typically has a structural defect at the site of Mg of the trioctahedral sheet and contains Na ions between adjacent sheets to compensate the shortage of electric charge attributable to that defect. Such Na ions can be subjected to ion-exchange and hence stevensite has an ion-exchange capacity. In the above general formula 1, x typically is a number between 0 and 1.

For the purpose of the present invention, clay minerals having principal ingredients of Si and Mg preferably have a sound and defect-free structural framework but the framework may be structurally partly defective.

For the purpose of the present invention, the layered structure of clay mineral having principal ingredients of Si and Mg may or may not have a regularly sequenced structural arrangement. While a clay mineral having a layered structure with a regularly sequenced structural arrangement, the (001) plane produces a peak of diffraction when observed by X-ray diffractometry, a catalyst according to the invention may not show such a peak.

For the purpose of the present invention, if a clay mineral having principal ingredients of Si and Mg has an ion-exchange capacity, its cations are preferably at least partly exchanged with hydrogen ions. The ion-exchange ratio is preferably 30% or more, more preferably 50% or more and most preferably 80% or more.

Ion-exchange operation can be conducted with any known method, although preferably cations are exchanged with ammonium ions in the first place, which are then converted into hydrogen ions through calcining.

For the purpose of the present invention, clay minerals comprising principal ingredients of Si and Mg have a surface area per unit weight of preferably 50 $m^2/g$ or more, particularly preferably between 100 and 700 $m^2/g$, more preferably between 150 and 650 $m^2/g$ and most preferably between 200 and 600 $m^2/g$.

If required for molding for the purpose of the present invention, a binder may be used with a catalyst carrier. Any appropriate binders may be used for the purpose of the invention and such binders include alumina, silica, silica-alumina and other metal oxides and clay minerals. Of these, alumina, silica-alumina and clay minerals may preferably be used. The most preferable selection will be alumina or a clay mineral containing alkali metal ions as cations.

When a binder is used, it is preferably added to a clay mineral having principal ingredients of Si and Mg in an amount of 20 to 95 wt %, more preferably 40 to 90 wt % and most preferably 50 to 80 wt % of the used carrier.

For the purpose of the present invention, any appropriate molding methods may be used. Examples of molding methods that can be used for the purpose of the invention include extrusion molding, tabletting and an oil drop method. The carrier is preferably calcined after the molding operation. The calcining temperature is preferably between 200 and 650° C. and more preferably between 400 and 600° C.

At least a metal selected form the VIII-group metals of the periodic table is used as active metal for the purpose of the invention. Metals that can be used for the purpose of the invention are preferably Ni, Ru, Rh, Pd and Pt, more preferably Ni, Pd and Pt and most preferably Pd and Pt. Any of these metals may be used alone or in combination with other such metal(s). Pt and Pd will provide a particularly preferable combination.

The active metal or each of the active metals carried by a catalyst carrier shows a weight ratio relative to the entire catalyst of preferably between 0.05 and 10 wt %, more preferably between 0.1 and 5 wt % and most preferably between 0.2 and 2 wt %.

Any of these metals can be made to be carried by a catalyst carrier by any known appropriate methods. Examples of techniques that can be used for the purpose of the present invention include ion-exchange method, impregnation method and gas phase carrying method. While the material of the catalyst carrier to be used for the purpose of the invention depends on the method selected for carrying the active metal(s), chlorides, nitrates, acetates and chloroammine complexes provide preferable candidates if ion-exchange method or impregnation method is used, while carbonyl compounds showing a certain degree of vapor pressure are preferably used with the gas phase carrying method. The metal or metals may be brought to be carried by the carrier preferably after the molding operation, although it or they may be made to be carried by the carrier prior to the molding operation.

Any of the main group elements and the transition elements including the rare earth elements may be added to a catalyst according to the invention as an ingredient other than the VIII-group metal(s).

A catalyst according to the invention is typically subjected to a calcining process. The temperature of the calcining process is preferably between 250 and 600° C., more preferably between 270 and 550° C. and most preferably between 280 and 500° C. Although not a prerequisite, it is preferably reduced by hydrogen in a hydrogen gas flow in a preliminary process. The reducing temperature is preferably between 200 and 500° C., more preferably between 250 and 450° C. and most preferably between 280 and 400° C.

For the purpose of the present invention, hydrocarbon oil containing a fraction having a boiling point between 170 and 390° C. preferably in an amount of 80 wt % or more, more preferably 90 wt % or more and most preferably 95% or more and aromatic hydrocarbons is used as a starting material (feed). The content of aromatic hydrocarbons contained in the hydrocarbon oil is preferably between 10 and 60 wt % and more preferably between 20 and 50 wt %.

The sulfur content of the feed hydrocarbon oil is preferably 0.2 wt % or less, particularly preferably 0.1 wt % or less, more preferably 0.05 wt % or less and most preferably 0.02 wt % or less. Similarly, the nitrogen content of the feed hydrocarbon oil is preferably 0.03 wt % or less, particularly preferably 0.02 wt % or less, more preferably 0.01 wt % or less and most preferably 0.005 wt % or less.

While a catalyst according to the present invention can process feed hydrocarbon oil having a sulfur content of 0.2 wt % or less and a nitrogen content of 0.03 wt % or less, the feed hydrocarbon oil is preferably subjected to a preliminary desulfurization and denitrification process to reduce the contents of sulfur, nitrogen and basic nitrogen compounds contained in the oil and minimize the possible poisoning of the catalyst by these impurities.

For the purpose of the present invention, feed hydrocarbon oil is preferably fractionated kerosene or gas oil, recycled oil obtained by catalytic cracking or a mixture thereof. More preferably, it is straight run kerosene, straight run gas oil, light cycled oil (LCO) or a mixture thereof. Most preferably, it is straight run gas oil, LCO or a mixture thereof.

A hydrogenating technique to be used for the purpose of the present invention is a technique that can hydrogenate aromatic hydrocarbons while suppressing the rate of hydrocracking, more specifically, that the content of decomposed/fractionated gas oil (or the yield of the product having a boiling point lower than the initial fractionating point of the feed hydrocarbon oil) in the final hydrocarbon oil is preferably 10 wt % or less, more preferably 8 wt % or less and most preferably 3 wt % or less.

According to the invention, the aromatic hydrocarbons contained in the feed hydrocarbon oil are hydrogenated in an amount of 30% or more, preferably 50% or more and most preferably 70% or more. Similarly, the polycyclic aromatic hydrocarbons contained in the feed hydrocarbon oil are hydrogenated in an amount of 70% or more, preferably 80% or more and most preferably 90% or more.

For the purpose of the present invention, polycyclic aromatic hydrocarbons are aromatic hydrocarbons having three or more than three aromatic rings in a molecule.

While a hydrogenation method that can be used for the purpose of the present invention may be a continuous method or a batch method and may be used with a fixed bed, a flowing bed or a suspended bed, it is preferably used on a continuous basis with a fixed bed from a practical viewpoint.

If it is used on a continuous basis with a fixed bed, the feed hydrocarbon oil and hydrogen may take the form of parallel rising flows, parallel falling flows or counter current flows.

While the hydrogenating process may be conducted under the atmospheric pressure for the purpose of the invention, it is preferably conducted under high pressure. The partial pressure of hydrogen in the hydrogenating process is preferably between 1 and 20 MPa, more preferably between 2 and 10 MPa and most preferably between 3 and 8 MPa.

The reaction temperature of the hydrogenating process for the purpose of the invention is preferably between 150 and 370° C., more preferably between 200 and 350° C. and most preferably between 220 and 340° C.

If the hydrogenating process is conducted on a continuous basis with a fixed bed, LHSV is preferably between 0.1 and 10 $h^{-1}$, more preferably between 0.3 and 5 $h^{-1}$ and most preferably between 0.5 and 4 $h^{-1}$.

For the purpose of the invention, the hydrogen/feed hydrocarbon oil ratio is preferably between 100 and 2,000Nl/l, more preferably between 200 and 1,500Nl/l and most preferably between 300 and 1,000Nl/l.

EXAMPLES

Now, the present invention will be described in greater detail by way of examples and comparative examples, although the scope of the present invention is not limited by these examples by any means.

Catalyst Preparation 1

Synthesized stevensite (IONITE-T: tradename, available from Mizusawa Industrial Chemicals Ltd., surface area per unit weight of 440 $m^2/g$) was put into an aqueous solution of 3.5M ammonium nitrate and ion-exchanged at 80° C. for 3 hours, while stirring the solution. It was filtered. After repeating the sequence three times, the ion-exchanged stevensite was washed, dried and then used to prepare a catalyst.

The obtained stevensite was mixed with boshmite (DISPERAL: tradename, available from CONDEA corp.) that had been deglued by dilute nitric acid and the mixture was kneaded well and then molded by extrusion molding. The molded product was dried and calcined at 550° C. for 3 hours to prepare a carrier. The stevensite content of the carrier was 70 wt %.

The carrier was impregnated with aqueous solution of a mixture of tetraamine platinum (II) dichloride and tetraamine palladium (II) dichloride by means of an incipient wetness technique, dried and then calcined at 300° C. for 3 hours to produce a catalyst carrying Pt and Pd, 0.3 wt % and 0.5 wt % respectively. The obtained catalyst was denoted as Catalyst A.

Catalyst Preparation 2

Another catalyst, or Catalyst B, was prepared by following the procedures of Catalyst Preparation 1 above except that synthesized stevensite was replaced by synthesized hectorite (IONITE-H: tradename, available from Mizusawa Industrial Chemicals Ltd.; surface area per unit weight of 350 $m^2/g$).

Catalyst Preparation 3

Another catalyst, or Catalyst C, was prepared by following the procedures of Catalyst Preparation 1 above except that synthesized stevensite was replaced by synthesized saponite (SMECTON SA: tradename, available from Kunimine Kogyo K.K.; surface area per unit weight of 230 $m^2/g$).

Catalyst Preparation 4

Another catalyst was prepared by using a commercially available adsorption agent Mizukalife (tradename, available from Mizusawa Industrial Chemicals Ltd.). The sole FIGURE shows the X-ray diffraction pattern of Mizukalife and that of the synthesized stevensite used in Catalyst Preparation 1 observed under the conditions listed as follows.

| | |
|---|---|
| X-ray | CuK-ALPHA1/40 kv/150 mA |
| Goniometer | vertical type goniometer |
| Attachment | ASC-43 (vertical type) |
| Filter | not used |
| Incident Monochrometer | |
| Counter Monochrometer | full-automatic monochrometer |
| Divergence Slit | 1 deg. |
| Scatter Slit | 1 deg. |
| Light Receiving Slit | 0.15 mm |
| Counter | scintillation counter |
| Scanning Mode | continuous |
| Scanning Speed | 2.000°/min. |
| Scanning Step | 0.010° |
| Axis of Scanning | 2Θ/Θ |
| Scanning Range | 3.000–65.000° |
| Θ Offset | 0.000° |
| Fixed Angle | 0.000° |

While Mizukalife did not show a diffraction peak (2θ-near 6°) due to the (001) plane, otherwise its diffraction pattern was similar to that of stevensite to reveal that it had a three-layered structure like stevensite. Table 1 shows the chemical composition of Mizukalife. Mizukalife is a clay mineral with principal ingredients of Si and Mg.

TABLE 1

| Chemical Composition of Mizukalife | |
|---|---|
| Chemical Composition | (wt %) |
| SiO | 62.1 |
| MgO | 29.1 |
| $Al_2O_3$ | 0.39 |
| $Fe_2O_3$ | 0.02 |
| CaO | 0.27 |
| $Na_2O$ | 0.41 |
| Ig-Loss | 7.7 |

Mizukalife P-2G (tradename, extrusion molded product, available from Mizusawa Industrial Chemicals Ltd.; surface area per unit weight of 570 $m^2/g$) was put into an aqueous solution of ammonium nitrate and was ion-exchanged at 80° C. for 3 hours, while stirring the solution. It was then filtered. After repeating the sequence three times, the ion-exchanged Mizukalife was washed, dried and then used for preparing a catalyst. The procedures of Catalyst Preparation 1 above were followed to produce the catalyst, or Catalyst D, except that the carrier of ion-exchanged stevensite was replaced by a carrier of the molded product of Mizukalife.

Catalyst Preparation 5

Another catalyst, or Catalyst E, was prepared by following the procedures of Catalyst Preparation 1 above except that the carrier of ion-exchanged stevensite was replaced by a extrusion-molded product of γ-alumina (000–1.5E: tradename, available from Nippon Ketjen Co., Ltd.).

Catalyst Preparation 6

Another catalyst, or Catalyst F, was prepared by following the procedures of Catalyst Preparation 1 above except that the carrier of ion-exchanged stevensite was replaced by a extrusion-molded product of silica-alumina (silica: 70 wt %, alumina: 30 wt %).

Catalyst Preparation 7

Acidic Y-type zeolite powder (HSZ-330HUA: tradename, available for Tosoh Corp.) was steam-treated at 800° C. for 6 hours. It was then put into an aqueous solution of 0.5N dilute nitric acid and was stirred at 80° C. for 1 hour. Thereafter, it was filtered, washed and dried. The obtained Y-type zeolite showed a unit lattice length of 24.25 angstroms and a silica/alumina ratio of 41.0 and contained Na by 0.1 wt %. A catalyst, or Catalyst G, was prepared by following the procedures of Catalyst Preparation 1 above except that synthesized stevensite was replaced by the obtained zeolite.

The prepared Catalyst A through G, the carriers and their Pt and Pd contents are listed in Table 2.

TABLE 2

Prepared Catalysts

| | Catalyst | Carrier | Pd (wt %) | Pd (wt %) |
|---|---|---|---|---|
| Catalyst Preparation 1 | Catalyst A | Stevensite | 0.3 | 0.5 |
| Catalyst Preparation 2 | Catalyst B | Hectorite | 0.3 | 0.5 |
| Catalyst Preparation 3 | Catalyst C | Saponite | 0.3 | 0.5 |
| Catalyst Preparation 4 | Catalyst D | MIZUKALIFE | 0.3 | 0.5 |
| Catalyst Preparation 5 | Catalyst E | γ-alumina | 0.3 | 0.5 |
| Catalyst Preparation 6 | Catalyst F | silica-alumina | 0.3 | 0.5 |
| Catalyst Preparation 7 | Catalyst G | US-Y | 0.3 | 0.5 |

EXAMPLE 1

A hydrogenating reaction was conducted to evaluate the initial activity of Catalyst A prepared in Catalyst Preparation 1 by using a fixed bed flow reaction apparatus filled with Catalyst A under the conditions summarized in Table 3.

TABLE 3

Reaction Conditions

| Reaction Pressure | 4.9 MPa |
|---|---|
| Hydrogen/Oil Ratio | 422 Nl/l |
| LHSV | 1.0 h$^{-1}$ |
| Reaction Temperature | 260, 280, 300° C. |

As feed hydrocarbon oil, oil obtained by desulfurizing a mixture oil containing straight run gas oil 80 vol % and LCO 20 vol % was used. (Table 4 summarizes the properties of the oil).

TABLE 4

Properties of the Feed Oil

| Sulfur Content | 110 wt ppm |
|---|---|
| Nitrogen Content | 23 wt ppm |
| Basic Nitrogen Content | lower than 1 wt ppm |
| Distillation Temperature | (° C.) |

TABLE 4-continued

Properties of the Feed Oil

| Initial Distillation Point/5% | 170/215 |
|---|---|
| 10%/30% | 235/271 |
| 50%/70% | 296/323 |
| 90%/95% | 360/374 |
| Final Distillation Point | 403 |
| Ratio of Aromatic Hydrocarbons * | 37.8 (wt %) |
| Ratio of Polycyclic Aromatic Hydrocarbons | 1.31 (wt %) |

* Aromatic hydrocarbons refer to all aromatic hydrocarbons including polycyclic aromatic hydrocarbons.

The initial activity was evaluated in a manner as described below. Before starting the reaction, the catalyst that filled the reaction vessel was subjected to a reducing process in an hydrogen gas flow at 300° C. for 5 hours. After lowering the temperature to 200° C., the feed hydrocarbon oil was made to flow therethrough and then the temperature was raised to 260° C., when the reaction was started. A sample was taken 48 hours after the start of the reaction. Then, the temperature was raised again to 280° C. and other sample was taken 48 hours thereafter. The temperature was raised to 300° C. and still another samples was taken 48 hours thereafter.

The aromatic hydrocarbon contents in the feed hydrocarbon oil and the refined hydrocarbon oil were analyzed by means of HPLC (IP391, a backflash method). The distillation temperature of the feed oil, that of the refined oil and the rate of yielding the decomposed light fraction (the yield of the fraction having a boiling point lower than the initial distilling point of the feed oil) were observed by means of distillation gas chromatography. The reaction ratio of aromatic hydrocarbons and that of polycyclic aromatic hydrocarbon were determined from the analysis of the samples taken after 48 hours from the start of the respective reaction temperatures. Table 5 summarizes the obtained results.

EXAMPLE 2

The initial activity of Catalyst B of Catalyst Preparation 2 was evaluated as in the case of Example 1. Table 5 summarizes the obtained results.

EXAMPLE 3

The initial activity of Catalyst C of Catalyst Preparation 3 was evaluated as in the case of Example 1. Table 5 summarizes the obtained results.

EXAMPLE 4

The initial activity of Catalyst D of Catalyst Preparation 4 was evaluated as in the case of Example 1. Table 5 summarizes the obtained results.

COMPARATIVE EXAMPLE 1

The initial activity of Catalyst E of Catalyst Preparation 5 was evaluated as in the case of Example 1. Table 5 summarizes the obtained results.

COMPARATIVE EXAMPLE 2

The initial activity of Catalyst F of Catalyst Preparation 6 was evaluated as in the case of Example 1. Table 5 summarizes the obtained results.

COMPARATIVE EXAMPLE 3

The initial activity of Catalyst G of Catalyst Preparation 7 was evaluated as in the case of Example 1. Table 5 summarizes the obtained results.

TABLE 5

Evaluation of the Initial Activity (after 48 hours of reation)

| | Catalyst | Reaction Temperature (° C.) | Ratio of Reacted Aromatic Hydrocarbons (%) | Ratio of Reacted Polycyclic Aromatic Hydrocarbons (%) | Yield of Decomposed Light Fraction (wt %) |
|---|---|---|---|---|---|
| Example 1 | Catalyst A | 260 | 88.0 | 100 | 0.9 |
| | | 280 | 94.3 | 100 | 0.9 |
| | | 300 | 85.6 | 100 | 1.4 |
| Example 2 | Catalyst B | 260 | 82.6 | 100 | 1.1 |
| | | 280 | 89.0 | 100 | 1.2 |
| | | 300 | 90.6 | 100 | 1.4 |
| Example 3 | Catalyst C | 260 | 85.8 | 100 | 1.3 |
| | | 280 | 92.6 | 100 | 1.3 |
| | | 300 | 93.6 | 100 | 1.4 |
| Example 4 | Catalyst D | 260 | 92.1 | 100 | 0.4 |
| | | 280 | 95.6 | 100 | 0.5 |
| | | 300 | 96.9 | 100 | 0.7 |
| Comparative Example 1 | Catalyst E | 260 | 11.3 | 45.3 | 0.2 |
| | | 280 | 12.0 | 46.7 | 0.7 |
| | | 300 | 12.7 | 50.4 | 0.9 |
| Comparative Example 2 | Catalyst F | 260 | 17.7 | 82.6 | 1.7 |
| | | 280 | 25.0 | 87.7 | 1.7 |
| | | 300 | 34.4 | 92.2 | 1.9 |
| Comparative Example 3 | Catalyst G | 260 | 53.4 | 84.7 | 2.5 |
| | | 280 | 80.8 | 96.2 | 3.7 |
| | | 300 | 90.5 | 97.7 | 9.7 |

EXAMPLE 5

A hydrogenating reaction was conducted to evaluate the service life of Catalyst A prepared in Catalyst Preparation 1 by using a fixed bed flow reaction apparatus filled with Catalyst A under the conditions summarized in Table 3 (reaction temperature: 300° C.). As feed hydrocarbon oil, oil obtained by desulfurizing a mixture oil containing straight run gas oil 80 vol % and LCO 20 vol % was used. (Table 6 summarizes the properties of the oil).

TABLE 6

Properties of the Feed Oil

| | |
|---|---|
| Sulfur Content | 380 wt ppm |
| Nitrogen Content | 81 wt ppm |
| Basic Nitrogen Content | 10 wt ppm |
| Distillation Temperature | (° C.) |
| Initial Distillation Point/5% | 171/224 |
| 10%/30% | 240/275 |
| 50%/70% | 303/332 |
| 90%/95% | 373/390 |
| Final Distillation Point | 427 |
| Ratio of Aromatic Hydrocarbons * | 41.2 (wt %) |
| Ratio of Polycyclic Aromatic Hydrocarbons | 1.76 (wt %) |

* Aromatic hydrocarbons refer to all aromatic hydrocarbons including polycyclic aromatic hydrocarbons.

Before starting the reaction, the catalyst that filled the reaction vessel was subjected to a reducing process in an hydrogen gas flow at 300° C. for 5 hours. After lowering the temperature to 200° C., the feed hydrocarbon oil was made to flow therethrough and then the temperature was raised to 300° C., when the reaction was started. The reaction was continued for 520 hours and the reaction ratio of aromatic hydrocarbons and the rate of yielding the decomposed light fraction were determined from the observations. Table 7 summarizes the obtained results.

COMPARATIVE EXAMPLE 4

The service life of Catalyst G of Catalyst Preparation 7 was evaluated as in the case of Example 5. Table 7 summarizes the obtained results.

TABLE 7

Evaluation of the Catalyst Service Life (after 520 hours of reaction)

| | Catalyst | Reaction Temperature (° C.) | Ratio of Reacted Aromatic Hydrocarbons (%) | Ratio of Reacted Polycyclic Aromatic Hydrocarbons (%) | Yield of Decomposed Light Fraction (wt %) |
|---|---|---|---|---|---|
| Example 5 | Catalyst A | 300 | 30.8 | 86.4 | 0.8 |
| Comparative Example 1 | Catalyst G | 300 | 14.6 | 74.6 | 3.9 |

As clearly seen from Table 5, catalysts according to the invention are highly active for hydrogenation if compared with a catalyst using a carrier of γ-alumina, a catalyst using a carrier of silica-alumina and a catalyst using a carrier of Y-type zeolite. Additionally, the rates of yielding the decomposed light fraction of catalysts according to the invention as a result of hydrocracking are very low as shown in Table 5. Finally, as shown in Table 7, a catalyst according to the invention remains highly active after a long use. Thus, a catalyst according to the invention can excellently suppress hydrocracking and can hydrogenate aromatic hydrocarbons.

As described above in detail, a catalyst according to the invention is highly resistant against sulfur and nitrogen compounds and shows a high hydrogenating activity for converting aromatic hydrocarbons in hydrocarbon oil containing sulfur and nitrogen compounds to saturated hydrocarbons for a prolonged period of time without entailing hydrocracking. A hydrogenation method according to the invention can effectively hydrogenate aromatic hydrocarbons and suppress hydrocracking.

What is claimed is:

1. A method of hydrogenating aromatic hydrocarbons in a hydrocarbon oil, said method comprising the step of bringing the hydrocarbon oil containing 80% by weight or more of a fraction having a boiling point of 170 to 390° C. and the aromatic hydrocarbons into contact with hydrogen in the presence of a catalyst which is clay minerals having principal ingredients of Si and Mg as carrier and at least one of the VIII-group metals of periodic table as active metal, said catalyst having a hydrocracking rate of 10 wt % or less and wherein said clay minerals do not contain zeolite.

2. A method of hydrogenating aromatic hydrocarbons in hydrocarbon oil according to claim 1, wherein said clay mineral has an ion-exchange capacity, and cations contained in said clay mineral are at least partly ion-exchanged with hydrogen ions in an ion-exchange ratio of 30% or more.

3. A method of hydrogenating aromatic hydrocarbons in hydrocarbon oil according to claim 1, wherein said clay mineral is one selected from the group consisting of stevensite, hectorite, saponite, vermiculite, sepiolite, palygorskite, chlorite and a mixture thereof.

4. A method of hydrogenating aromatic hydrocarbons in hydrocarbon oil according to claim 3, wherein said clay mineral is one selected form the group consisting of stevensite, hectorite, saponite and a mixture thereof.

5. A method of hydrogenating aromatic hydrocarbons in hydrocarbon oil according to claim 1, wherein said clay minerals have a surface area per unit weight of 50 m²/g or more.

6. A method of hydrogenating aromatic hydrocarbons in hydrocarbon oil according to claim 1, wherein said catalyst contains a binder which is alumina or a clay mineral containing alkali metal ions as cations, and the amount of said binder is 20 to 95 wt % of the combination of carrier and binder.

7. A method of hydrogenating aromatic hydrocarbons in hydrocarbon oil according to claim 1, wherein said clay minerals having principal ingredients of Si and Mg are synthetic clay minerals.

8. A method of hydrogenating aromatic hydrocarbons in hydrocarbon oil according to claim 1, wherein the hydrocarbon oil contains 90% by weight or more of a fraction having a boiling point of 170 to 390° C.

9. A method of hydrogenating aromatic hydrocarbons in hydrocarbon oil according to claim 1, wherein the hydrocarbon oil is one selected from the group consisting of straight run kerosene, straight run gas oil, LCO and a mixture thereof.

10. A method of hydrogenating aromatic hydrocarbons in hydrocarbon oil according to claim 1, wherein the hydrocarbon oil contains 0.05 * by weight or less of sulfur.

11. A method of hydrogenating aromatic hydrocarbons in hydrocarbon oil according to claim 1, wherein the rate of hydrocracking is 3 wt % or less.

12. A method for hydrogenating aromatic hydrocarbons in hydrocarbon oil according to claim 2, wherein said catalyst has an ion-exchange ratio is 50% or more, the amount of Si and Mg as $SiO_2$ and MgO in the clay mineral is 60% or more, the clay mineral has a surface area per unit weight of 100 to 700 m²/g and the active metal is 0.05 to 10 wt %.

13. A method for hydrogenating aromatic hydrocarbons in hydrocarbon oil according to claim 12, wherein said ion-exchange ratio is 80% or more, the amount of Si and Mg as $SiO_2$ and MgO in the clay mineral is 70% or more, the clay mineral has a surface area per unit weight of 150 to 650 m²/g and the active metal is 0.1 to 5 wt %.

14. A method for hydrogenating aromatic hydrocarbons and hydrocarbon oil according to claim 13, wherein said surface area is 200 to 600 m²/g, the amount of active metal is 0.2 to 2% and said catalyst contains a binder which is alumina or a clay mineral containing alkali metal ions as cations and the amount of said binder is 40 wt % to 90 wt % of the combination of the carrier and binder.

15. A method for hydrogenating aromatic hydrocarbons in hydrocarbon oil according to claim 14 in which said binder is 50 wt % to 80 wt % of the combination of carrier and binder and said clay mineral having principal ingredients of Si and Mg is stevensite.

16. A method of hydrogenating aromatic hydrocarbons in a hydrocarbon oil, said method comprising the step of bringing the hydrocarbon oil containing 80% by weight or more of a fraction having a boiling point of 170 to 390° C. and the aromatic hydrocarbons into contact with hydrogen in the presence of a catalyst consisting essentially of clay minerals having principal ingredients of Si and Mg as carrier and at least one of the VIII-group metals of periodic table as active metal and wherein said clay minerals do not contain zeolite.

17. A method for hydrogenating aromatic hydrocarbons in hydrocarbon oil according to claim 15 in which said method is effected at a partial pressure of hydrogen between 3 and 8 MPa, a reaction temperature between 220 and 340° C., a LHSV between 0.5 and 4 h$^{-1}$ a the hydrogen/feed hydrocarbon ratio between 300 and 1000Nl/l.

18. A method for hydrogenating aromatic hydrocarbons in hydrocarbon oil according to claim 1 in which said method is effected at a partial pressure of hydrogen between 1 and 20 MPa, a reaction temperature between 150 and 370° C., a LHSV between 0.1 and 10 h$^{-1}$ and a hydrogen/feed hydrocarbon ratio between 100 and 2000Nl/l.

19. A method for hydrogenating aromatic hydrocarbons in hydrocarbon oil according to claim 18 in which the partial pressure of hydrogen is between 2 and 10 MPa, the reaction temperature is between 200 and 350° C., the LHSV is between 0.3 and 5 h$^{-1}$ and the hydrogen/feed hydrocarbon ratio is between 200 and 1500Nl/l.

20. A method for hydrogenating aromatic hydrocarbons in hydrocarbon oil according to claim 19 in which the partial pressure of hydrogen is between 3 and 8 MPa, the reaction is between 220 and 340° C., the LHSV is between 0.5 and 4 h$^{-1}$ and the hydrogen/feed hydrocarbon ratio is between 300 and 1000Nl/l.

* * * * *

UNITED STATES PATENT AND TRADEMARK OFFICE
CERTIFICATE OF CORRECTION

PATENT NO.    : 6,175,046 B1
DATED         : January 16, 2001
INVENTOR(S)   : Toshiyuki Enomoto et al.

It is certified that error appears in the above-identified patent and that said Letters Patent is hereby corrected as shown below:

<u>Item [73], Assignee:</u>
"Nippon Oil Company, Limited", should read -- Nippon Mitsubishi Oil Corporation --.

Signed and Sealed this

Eighteenth Day of September, 2001

Attest:

*Nicholas P. Godici*

NICHOLAS P. GODICI
*Attesting Officer*      *Acting Director of the United States Patent and Trademark Office*